United States Patent [19]
Blaschke

[11] 3,863,959
[45] Feb. 4, 1975

[54] PIPE CONNECTION

[76] Inventor: Kurt Karl Blaschke, Liesbeth-Dill-Strasse 21, 6602 Dudweiler/Saar, Germany

[22] Filed: Mar. 5, 1973

[21] Appl. No.: 338,304

[30] Foreign Application Priority Data
Mar. 7, 1972 Germany............................ 2210980

[52] U.S. Cl................... 285/24, 151/38, 151/69, 285/90, 285/321, 285/330, 285/DIG. 14
[51] Int. Cl............................................... F16l 55/00
[58] Field of Search......... 285/24, 27, 90, 321, 330, 285/DIG. 7, DIG. 14; 151/38, 69

[56] References Cited
UNITED STATES PATENTS
| | | | |
|---|---|---|---|
| 753,096 | 2/1904 | Osteen............................ | 285/355 X |
| 2,439,161 | 4/1948 | Du Bois........................ | 285/DIG. 14 |
| 3,345,087 | 10/1967 | Hanes et al...................... | 285/90 X |
| 3,350,103 | 10/1967 | Ahlstone......................... | 285/141 X |
| 3,689,113 | 9/1972 | Blaschke......................... | 285/330 X |

FOREIGN PATENTS OR APPLICATIONS
| | | | |
|---|---|---|---|
| 2,199 | 2/1886 | Great Britain................. | 285/DIG. 7 |
| 428,063 | 4/1926 | Germany............................. | 151/69 |
| 38,192 | 4/1965 | Germany............................. | 285/90 |
| 59,760 | 1/1968 | Germany............................. | 285/90 |

*Primary Examiner*—Jordan Franklin
*Assistant Examiner*—Moshe I. Cohen
*Attorney, Agent, or Firm*—Bacon & Thomas

[57] ABSTRACT

A releasable boring pipe connection in which two pipe ends have interlocking tooth formations at their abutting end faces. An annular groove is formed on the external peripheral surface of the teeth overlap and a retaining ring is held in the groove by locking screws. The lateral blanks of the ring and the opposed lateral faces of the groove are radially inwardly convergent at a self-locking angle.

7 Claims, 4 Drawing Figures

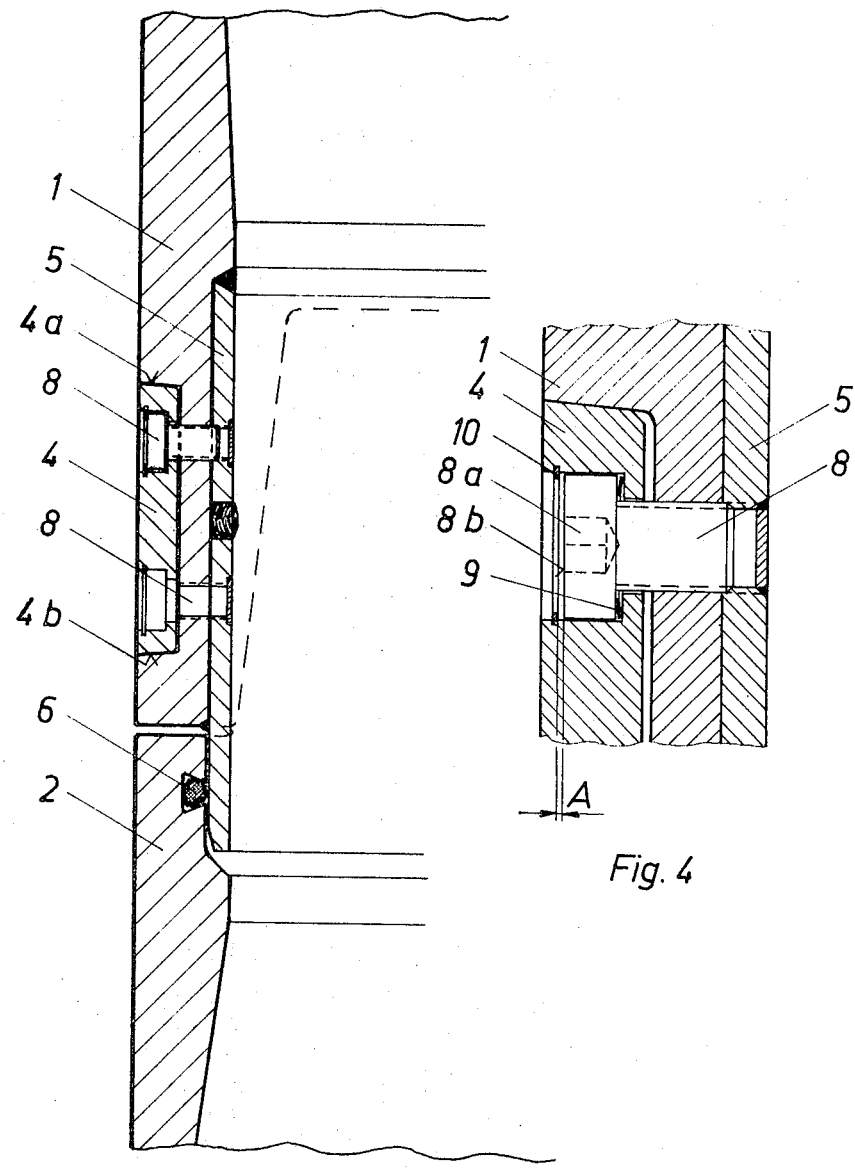

PIPE CONNECTION

BACKGROUND OF THE INVENTION

1. Field of the Invention

The invention relates to a detachable pipe connection for single and double-walled pipes, in particular a boring pipe connection, consisting of matching toothed rims provided on opposing ends of two pipes to be connected, the teeth of which rims having a peripheral groove for receiving a spring ring serving as a retaining member in flush alignment with the outer pipe diameter. Pipe connections of this type are intended to be easily set up and disconnected by means of the spring ring, the interlocking teeth of the two pipe ends facilitating the transmission of boring torque.

2. Description of the Prior Art

In a case of the known pipe connection, the spring ring has a rectangular cross section with parallel end faces. Therefore, it cannot be inserted without axial play in its groove. Its purpose is in fact solely to provide an economical pipe connection which is able to absorb high tensile, rotary, radial and bending forces. In this case, the rotary forces are absorbed by the interlocking teeth of the pipe ends. Therefore, the known pipe connection is advantageous when used on boring pipes which are subjected to rotary oscillations during penetration into the ground.

In many cases, however, it is desirable that the boring pipes are subjected additionally or primarily to vibratory oscillations which are axially directed, in order to facilitate penetration into the ground. If such axially directed oscillations occur, they must be transmitted by the spring ring, which, as mentioned, could not heretofore be assembled without axial play of the circumferential groove in the toothed pipe ends. The result is that the groove and/or the spring ring tend to fail under the severe impact stress. Even arranging the teeth with inclined flanks changes nothing in this respect, since such inclined flanks mean only that rotary oscillations are better transmitted.

SUMMARY OF THE INVENTION

It is an object of the present invention to provide a boring pipe connection with a spring ring serving as a preloaded axial retaining means so that high axial vibratory forces may be transmitted without damage, the invention suggesting that the narrow axial end faces of the spring ring as well as the cooperating flanks of the groove be slightly tapered, the spring ring being arranged to be radially drawn into the groove by lockable clamping screws. In this way the spring ring engages each tooth clearance-free in both axial directions, being clamped into the continuous groove when the pipe ends are fitted into one another. This wedge-type, clearance-free engagement prevents the groove flanks from being worn down, or the spring ring from being destroyed.

The invention suggests that, the angle of taper on the spring ring end faces and groove flanks be less than the angle of static friction between these abutting faces so that the spring ring halves cannot shift radially outwardly under axial compression forces. This self-locking condition is always fulfilled, when the angle of taper is smaller than the angle of friction, because then the frictional resistance against radial displacement is, by definition, greater than the radial force component acting on the tapered faces under axial load.

The invention is applicable in the same manner for toothed pipe ends with rectangular straight teeth, or with trapezoidal teeth having inclined tooth flanks. Particularly with trapezoidal teeth, which tooth shape gives the two pipe ends a definite axial engagement depth, it is advisable to machine the groove for the tapered spring ring when the pipe ends are fitted into one another. In order to ensure a reliable abutment of the narrow tapered axial end faces of the spring ring against the flanks of the groove, the invention further suggests that a referencing dog be attached to a tooth recess so as to engage a matching notch in a tooth of the opposing pipe end, the rotation-angular insertion position of the toothed rims being thereby determined once and for all. Thus the groove is always reestablished uniformly and continuously when the pipe connection is assembled in the field, as it was originally assembled for the common machining of both pipe ends.

The invention also relates to a new screw locking device which keeps the clamping screws under tension, after the spring ring is drawn into the groove. According to the invention, this screw locking device consists in that the countersunk clamping screw heads may be clamped against spring washers and that a retaining ring is inserted in a groove in the countersunk bores of the spring ring at a distance from the heads of the tightened screws, which distance is small enough that the spring washers exert their tension on the screw bolts, even if the screw heads are partially released until they abut against the retaining rings.

BRIEF DESCRIPTION OF THE DRAWINGS

One embodiment of the pipe connection according to the invention is illustrated in the drawings in which, FIG. 3 is an enlarged partial axial cross section, and FIG. 4 shows enlarged details of the screw locking device.

DESCRIPTION OF THE PREFERRED EMBODIMENT

Figure 1:
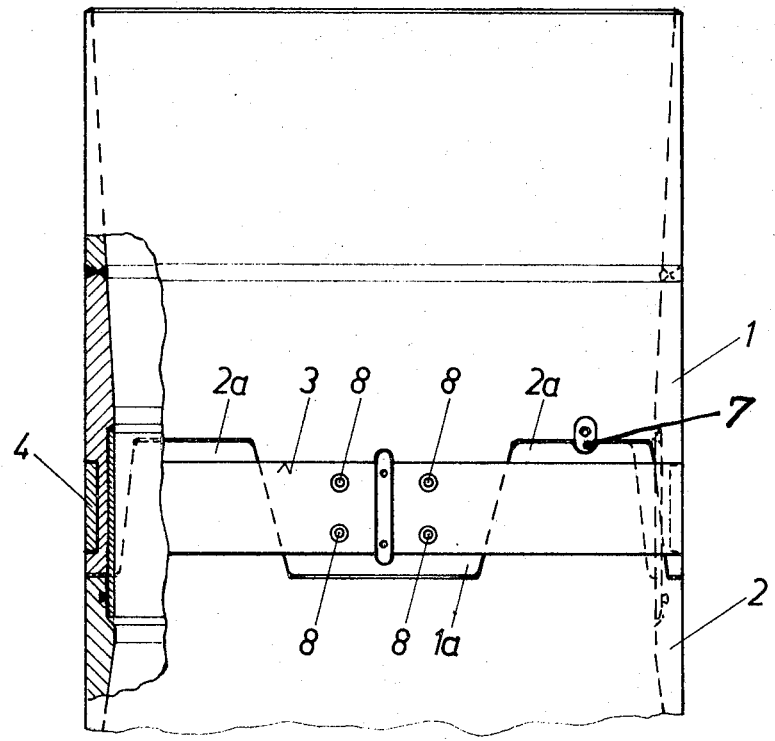
FIG. 1 is a side view in partial axial cross section.
Figure 2:
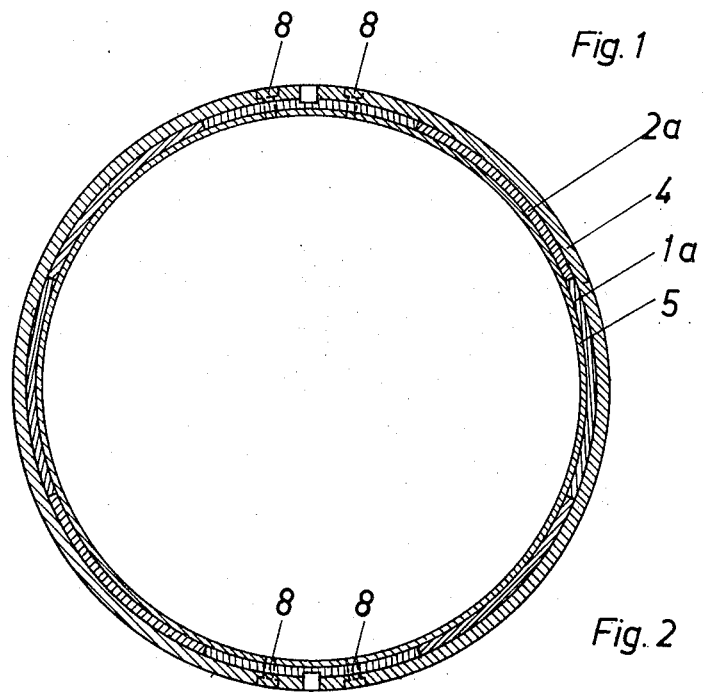
FIG. 2 is a radial cross section through the spring ring.

FIG. 1 shows the two pipe ends 1 and 2 in the connected position. The pipe end 1 is provided with teeth 1a and the pipe end 2 with teeth 2a, the teeth having inclined flanks engaging one another without play. It should be understood that the tooth flanks may also be parallel to each other.

The outer sides of the teeth 1a and 2a are machined to define a continuous circumferential groove 3, when the pipe ends are fitted one in the other. The two axial end faces 4a and 4b of a spring ring 4, which is engaged in the groove 3, and the cooperating flanks of the latter are slightly inclined towards each other at an inwardly converging taper angle which is preferably smaller than the angle of static friction between the contact faces of cooperating parts 3 and 4.

In the embodiment, a sealed pipe connection is illustrated in that at the level where the teeth 1a and 2a interlock, the pipe end 1 supports an inner steel ring 5 which bears against a sealing ring 6 in the other pipe end 2 when the pipe ends are connected.

In the illustrated embodiment, the spring ring 4 is split into two halves, each of which is drawn into the groove 3 by two pairs of clamping screws 8 which are located near the extremities of the ring halves as shown in FIG. 1. When determining the dimensions of the spring ring 4 and groove 3, it is advantageous that the outer periphery of the spring ring should be as flush as possible with the outer periphery of the pipe, and the inner periphery of the spring ring should not rest on the base of the groove.

As a result of the clearance-free wedge-like engagement of the spring ring 4 in the groove portions of the teeth of both pipe ends, axial vibratory forces are safely transmitted across the pipe connection, because the pipe ends are rigidly locked together.

FIG. 1 shows a small semi-circular recess provided in the top face of a tooth 2a, in which recess a referencing dog 7 is engaged, which is attached to the base of the opposing tooth recess. This dog 7 assures that the pipe ends can only be fitted together in a predetermined rotation-angular position. If the groove 3 is machined with the pipe ends engaged in this predetermined position, then the engagement of the dog 7 in the semi-circular recess re-establishes the identical engagement position each time the pipe connection is assembled. Thus, the groove 3 is always reconstituted in the precise, aligned state to which it was originally machined.

A screw locking device is provided for the clamping screws 8 and is shown at an enlarged scale in FIG. 4. In this arrangement, the recessed screw heads 8a of the clamping screws are clamped against spring washers 9 resting on the shoulders of countersunk bores in the spring ring 4. FIG. 4 shows a clamping screw in the securely tightened position in which the outer screw head face 8b is spaced a distance A from a retaining ring (for example, a so-called Seeger retaining ring) 10 inserted in a retaining groove of the bore. This distance A and the spring deflection of the spring washer 9 are such that the screw may become partially unscrewed until its head face 8b abuts against the retaining ring 10, without the spring washer 9 becoming relaxed. Thus, the spring washer 9 maintains tension under the screw at all times, and the screw cannot loosen. In the other direction of rotation, the screw 8 can not loosen either, since it also abuts against the retaining ring 10 under tension. Thus, the spring ring 4 remains drawn into its groove 3 with the greatest possible security.

The new screw locking device with the spring washer 9 and the head retaining ring may be used to advantage wherever the slightest loosening of a screw is to be avoided.

What is claimed is:

1. A releasable pipe connection for axially and rotationally connecting adjoining pipe sections, such as sections of boring pipe and the like, comprising in combination:

two axially adjoining pipe end portions, each having a plurality of regularly spaced axial teeth with matching axial recesses therebetween for receiving therein the axial teeth of the other pipe end portion, the mating teeth thus defining an axially overlapping portion between the two pipe end portions, the pipe wall in said overlapping portion being thus alternatingly part of one or the other of the two pipe end portions;

an annular groove on the outer side of the pipe wall in said overlapping portion of the two pipe end portions, said groove having a substantially cylindrical bottom surface and outwardly extending axial flanks which are thus alternatingly part of one or the other of the two pipe end portions; and a split spring ring received within said annular groove, the spring ring having opposite axial end faces abutting against said flanks of the annular groove; and wherein:

one of the two axial end faces of the spring ring and its associated abutting groove flank define a surface orientation which converges with the surface orientation of the other axial end face and associated abutting groove flank in a shallow, self-locking taper, the angle of taper being smaller than the angle of friction obtaining between said abutting surfaces of the spring ring and of the annular groove, so as to permit the creation of an axial preload between the adjoining pipe end portions, through radial pressure applied to the spring ring, while avoiding any taper-induced radial force reaction on the spring ring, when the pipe connection is subjected to an axial load.

2. A pipe connection as defined in claim 1, wherein both axial end faces of the spring ring and both axial flanks of the annular groove, respectively, are identically tapered.

3. A pipe connection as defined in claim 1, further comprising:

means for releasably clamping the spring ring radially into the annular groove in the overlap portion of the pipe ends.

4. A pipe connection as defined in claim 3, wherein the spring ring is circumferentially subdivided into at least two peripherally adjacent spring ring sections; the clamping means includes clamping screws engaging each spring ring section, the spring ring and the underlying wall portions of the pipe end portions having appropriate through-bores and threaded bores, respectively, for said clamping screws; and said clamping screws are of the countersunk type, each screw having a spring washer under its head, matching countersunk bores being arranged in the spring ring.

5. A pipe connection as defined in claim 4, wherein: the countersunk bores for the clamping screw heads are deeper than the height of the screw heads and include a retainer groove in their wall; and the clamping means further includes a retaining ring in each of said retainer grooves, which ring is so positioned in relation to the screw head that the clamping screw, when unscrewed from its fully tightened position, abuts outwardly against the retaining ring, before the spring washer under the screw head is relaxed.

6. A pipe connection as defined in claim 1, wherein one of said axially extending teeth in one pipe end portion and the cooperating recess in the other pipe end portion define between them means for angularly referencing the two pipe end portions relative to one another so as to permit assembly thereof in only one rotation-angular orientation.

7. A pipe connection as defined in claim 6, wherein: the angular referencing means includes an axially extending dog on one of the two elements defining said means, and a matching axial recess on the other of said elements.

* * * * *